US009635419B2

(12) United States Patent
O'Hern

(10) Patent No.: US 9,635,419 B2
(45) Date of Patent: *Apr. 25, 2017

(54) VIDEO CONTENT MONITORING DEVICE AND METHODS THEREOF

(71) Applicant: AT&T Intellectual Property I, LP, Atlanta, GA (US)

(72) Inventor: William O'Hern, Spring Lake, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/329,256

(22) Filed: Jul. 11, 2014

(65) Prior Publication Data

US 2014/0325548 A1 Oct. 30, 2014

Related U.S. Application Data

(63) Continuation of application No. 11/868,137, filed on Oct. 5, 2007, now Pat. No. 8,812,710.

(51) Int. Cl.

| H04N 21/25 | (2011.01) |
|---|---|
| H04N 21/442 | (2011.01) |
| H04N 21/24 | (2011.01) |
| H04N 21/258 | (2011.01) |
| H04N 21/266 | (2011.01) |
| H04N 21/647 | (2011.01) |

(Continued)

(52) U.S. Cl.
CPC ... *H04N 21/44209* (2013.01); *H04N 21/2407* (2013.01); *H04N 21/25* (2013.01); *H04N 21/25891* (2013.01); *H04N 21/26603* (2013.01); *H04N 21/442* (2013.01); *H04N 21/64723* (2013.01); *H04N 21/8456* (2013.01); *H04H 60/64* (2013.01)

(58) Field of Classification Search
None
See application file for complete search history.

(56) References Cited

U.S. PATENT DOCUMENTS

| 5,351,075 A | 9/1994 | Herz |
|---|---|---|
| 5,550,577 A | 8/1996 | Verbiest |

(Continued)

OTHER PUBLICATIONS

"Sep. 26, 2007 Wayback Machine capture of youtube.com", (http://web.archive.org/web/20070926221746/http://www.youtube.com/browse?s=mp) (with banner).

(Continued)

*Primary Examiner* — Benjamin Lamont
(74) *Attorney, Agent, or Firm* — Guntin & Gust, PLC; Jay H. Anderson

(57) ABSTRACT

A method that incorporates teachings of the subject disclosure may include, for example, receiving a packet indicative of a request for a number of video content items. The video content items are identified based on a network traffic flow characteristic associated with the packet and a popularity level is determined associated with each video content item of the number of video content items. The popularity level for each of the video content items is compared to a popularity threshold, and a portion of a video content item is displayed responsive to the popularity level exceeding the popularity threshold. Other embodiments are disclosed.

19 Claims, 3 Drawing Sheets

(51) Int. Cl.
*H04N 21/845* (2011.01)
*H04H 60/64* (2008.01)

(56) References Cited

U.S. PATENT DOCUMENTS

| | | | |
|---|---|---|---|
| 6,415,327 B1 | 7/2002 | Beckerman | |
| 7,293,275 B1 | 11/2007 | Krieger | |
| 7,765,320 B2* | 7/2010 | Vehse | H04L 12/2697 370/241 |
| 7,769,827 B2 | 8/2010 | Girouard | |
| 2002/0091791 A1 | 7/2002 | Kang | |
| 2003/0046357 A1 | 3/2003 | Doyle | |
| 2006/0008256 A1* | 1/2006 | Khedouri et al. | G06F 17/30038 386/234 |
| 2006/0101504 A1* | 5/2006 | Aravamudan | H04N 5/44543 725/136 |
| 2007/0174257 A1 | 7/2007 | Howard | |
| 2007/0220573 A1 | 9/2007 | Chiussi | |
| 2007/0266406 A1* | 11/2007 | Aravamudan | H04N 21/4126 725/57 |
| 2008/0002698 A1 | 1/2008 | Pantalone | |
| 2008/0104626 A1 | 5/2008 | Avedissian | |
| 2009/0007198 A1* | 1/2009 | Lavender et al. | H04N 7/163 725/91 |
| 2010/0177773 A1 | 7/2010 | Kölhi et al. | |
| 2014/0040240 A1* | 2/2014 | Yang | G06F 17/3082 707/722 |

OTHER PUBLICATIONS

"Sep. 26, 2007 Wayback Machine capture of youtube.com", (http://web.archive.org/web/20070926221746/http://www.youtube.com/browse?s=mp) (without banner).
"Wayback Machine capture of youtube.com on Jun. 6, 2007 (displays # of views and user ratings)".
Apr. 7, 2007 Wayback Machine screen capture of last page of "Most Viewed (This Week)" list on youtube.com (with banner).
Apr. 7, 2007 Wayback Machine screen capture of last page of "Most Viewed (This Week)" list on youtube.com (without banner).

* cited by examiner

VIDEO CONTENT MONITORING DEVICE AND METHODS THEREOF

CROSS-REFERENCE TO RELATED APPLICATIONS

This application is a continuation of and claims priority to U.S. patent application Ser. No. 11/868,137, filed Oct. 5, 2007. The contents of the foregoing are hereby incorporated by reference into this application as if set forth herein in full.

FIELD OF THE DISCLOSURE

The present disclosure relates to network monitoring devices and more particularly to video content monitoring devices.

BACKGROUND OF THE DISCLOSURE

Video content is available from a wide variety of sources, including wide area networks such as the Internet. Because of the large number of independent content providers and the large amount of content, it can be difficult to efficiently locate desirable video content in the wide area network. For example, video content can be located with a search engine, but such engines typically return a large number of possible content locations.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method of providing video content includes monitoring packets communicated between data processing devices in a network. The packets are monitored at a third data processing device in the network backbone. Based on the monitored packets, statistics are collected that indicate the popularity of video content items available via the network. The most popular video content items, as indicated by the collected statistics, are made available via a web page.

Figure 1:
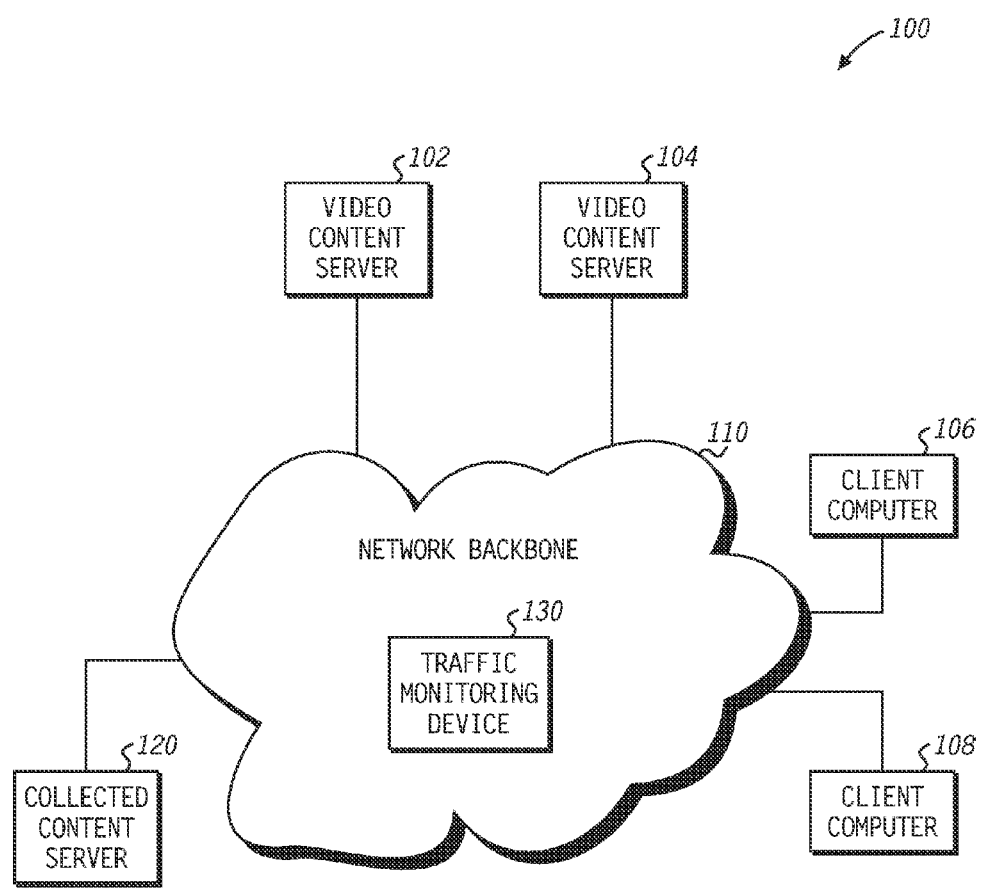
FIG. 1 is a block diagram of a particular embodiment of a data network.

FIG. 1 shows a block diagram of a particular embodiment of a data network 100, including a video content server 102, a video content server 104, a client computer 106, a client computer 108, a network backbone 110, a collected content server 120, and a traffic monitoring device 130. Each of the client computers 106 and 108, the video content servers 102 and 104, and the collected content server 120 are connected to the network backbone 110. The network backbone 110 may include servers, routers, and other equipment to provide communication paths between the client computers 106 and 108, the video content servers 102 and 104, and the collected content server 120. The network backbone 110 provides a wide area network, and can also be part of a larger wide area network such as the Internet.

In operation, the client computers 106 and 108 provide packets to the network backbone 110 representing requests for content. For example, the client computer 106 can execute a web browser application. A user interfacing with the web browser application can request a particular web page or other content from another location in the data network 100. In response, the client computer 106 forms one or more packets representing a request for the content. The request will typically indicate a network address, such as an Internet Protocol (IP) address, associated with the requested content.

The network backbone 110 receives packets from client computer 106 and the client computer 108. Based on routing information associated with each packet, the network backbone 110 routes each packet to the appropriate destination in the data network 100. For example, the network backbone 110 can analyze a packet to determine an IP address and route the packet based on the determined address.

The video content servers 102 and 104 receive packets from the network backbone 110 representing requests for content stored at the servers. In response to the requests, the video content servers provide packets representing the requested content to the network backbone 110 for routing. For example, a user at the client computer 106, via a web browser or other application, can request a video content item from the video content server 102. In response, the client computer 106 forms and sends one or more packets representing the request to the network backbone 110. The packets include an IP address associated with the requested video content. Based on the address, the network backbone 110 routes the packets to the video content server 102. In response to receiving the packets, the video content server 102 retrieves the requested video content item.

The video content server 102 divides the video content item into packets and provides the packets to the network backbone 110, which routes the packets to the client computer 106. At the client computer 106 the video content item can be stored as a file, displayed in a streaming fashion, or the like.

The client computer 106 and the client computer 108 can also exchange information via the network backbone 110 in a peer-to-peer fashion. For example, a peer-to-peer communication program executed at the client computer 106 can issue one or more packets representing a request for a video content item from the client computer 108. The network backbone 110 analyzes the packets and, based on address information incorporated in one or more of the packets, routes the packets to the client computer 108. In response to receiving the packets, a peer-to-peer communication program at the client computer 108 retrieves the requested content, divides it into one or more packets, and provides the packets to the network backbone 110 for routing to the client computer 106.

The traffic monitoring device 130 can be a standalone device, part of a server or router, or otherwise incorporated into the network backbone 110. The traffic monitoring device 130 monitors packets routed through the network backbone 110 and determines whether a packet represents a request for video content. This determination can be made based on a network traffic flow characteristic, such as an IP address. For example, individual video content items at the video content server 102 can each be associated with a unique IP address. The traffic monitoring device 130 can store a set of IP addresses associated with the individual video content items located at the video content servers 102 and 104. In response to identifying a packet including an IP address listed in the stored set, the traffic monitoring device 130 can record information indicating that the video content item associated with the address was requested. By monitoring packets routed via the network backbone over time, the traffic monitoring device 130 can compile and store statistics indicating the frequency with which particular video content at the video content servers 102 and 104 is requested. Accordingly, the statistics indicate the popularity level for individual video content items available in the data network 100.

The traffic monitoring device 130 can also identify peer-to-peer requests for video content items by identifying packets including an IP address uniquely associated with a video content item. Alternatively, the traffic monitoring device 130 can identify video content requests based on file name information, location information, or the like, that are stored in the packets representing the requests.

The traffic monitoring device 130 can also identify video content based on packets representing the video content itself. For example, the packets representing the content can include an IP address associated with the video content that can be identified by the traffic monitoring device 130.

In addition to recording the number of times particular video content has been requested or provided, the traffic monitoring device 130 can record other information associated with the video content. For example, the traffic monitoring device 130 can determine the source of each request for particular video content based on packets associated with the request. The request packets can include IP address or other information indicating the source of the request. The traffic monitoring device 130 can use this source information to record additional information associated with video content. For example, the traffic monitoring device 130 can build a geographic profile of the source of requests for video content. The traffic monitoring device 130 can also determine when requests for content are issued and use that information to build a temporal profile for the requests for video content. In addition, the traffic monitoring device 130 can record category information associated with requested video content. The category information can be obtained from tables stored at the traffic monitoring device, by accessing category information contained in the packets representing the video content, or the like.

The collected content server 120 accesses the statistical and other information associated with requested video content stored at the traffic monitoring device 130 and develops web content based on the information. The web content can be provided as a web page to the client computer 106 and the client computer 108. Based on the information stored at the traffic monitoring device 130, the web content can include a listing of the most requested video content. Accordingly, the web content provides a simple and accessible way for a user of the client computer 106 or the client computer 108 to determine the most popular videos available over the network backbone 110.

The web page provided by the collected content server 120 can also provide other information and content, including hyperlinks to the listed video content. The collected content server 120 can also retrieve the most popular content items from the video servers 102 and 104 so that the most popular video content items are stored in a central location. Moreover, the collected content server 120 can retrieve the entire video content items or a portion of video content so that video content "clips" can be displayed via the web page.

Figure 2:
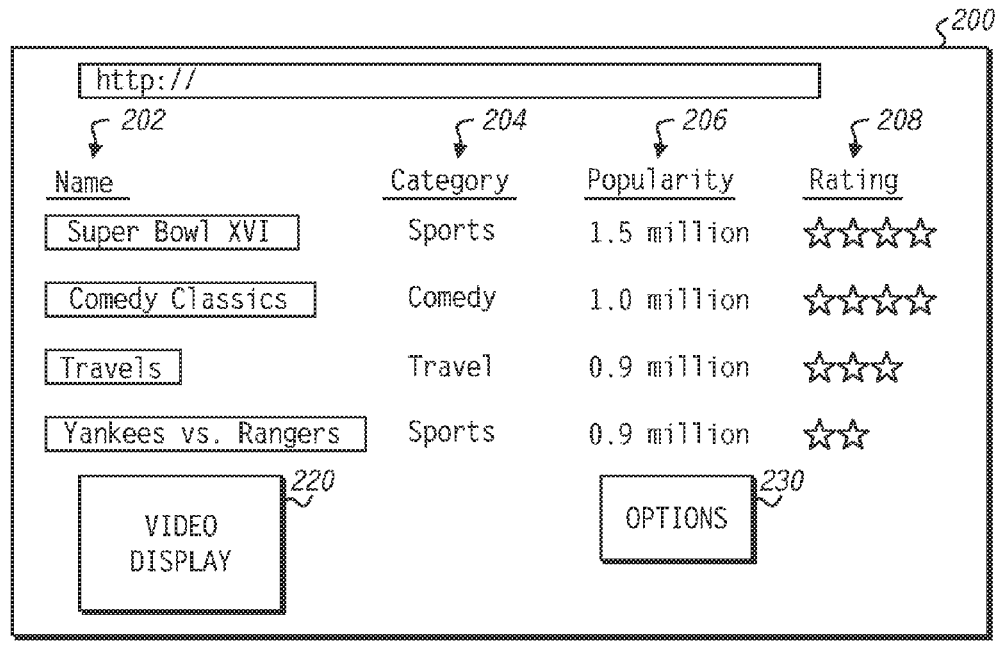
FIG. 2 is a block diagram of a particular embodiment of a web page at a client computer of the data network of FIG. 1.

FIG. 2 shows a diagram of a particular embodiment of a web page 200 including a name field 202, a category field 204, a popularity field 206, and a rating field 208. The web page 200 also includes a video display window 220 and an options button 230. The web page 200 is based on web content provided by the collected content server 120 and can be displayed at the client computer 106 or the client computer 108 via a web browser program or the like. As illustrated, the web page 200 can list video content items in order of their popularity based on the number of requests for each content item identified at the traffic monitoring device 130. The name field 202 indicates the name of each video content item while the category field 204 indicates the category for the associated video content item. The popularity field 206 indicates the number of requests for the associated video content item as indicated by the data collected at the traffic monitoring device 130. Further, the rating field 208 can indicate an average rating for the associated video content item. In a particular embodiment, the average rating is based on ratings by users who have requested the video content, or by users who have accessed the video content item via the web page 200.

A user can interact with the web page 200 to reorganize the information displayed. For example, a user can use a computer mouse to select the category field 204 to reorganize the displayed list of video content items based on an item category. This allows a user to identify which content items are the most popular for a particular category. For example, a user could quickly identify the most popular video content items associated with sports.

The web page 200 can also display video content items, or clips of video content items, via the video display window 220. A user can select a video content item by, for example, using a computer mouse to select a name set forth in the name field 202. In response, the video content item associated with the selected name can be played via the video display window 220. Accordingly, a user can quickly and easily access popular video content via the web page 200.

Alternatively, in response to selection of a video content item via the name field 202, the web page 200 can provide a clip of the item via the video display window 220. After playing the clip, the web page 200 can provide the user with an option to display the entire video content item. Thus, the web page 200 provides a convenient way for a user to watch preview clips of popular content items and determine whether she wants to view the entire content.

It will be appreciated that although the video display window 220 is illustrated as part of the web page 200, the video display window could also be a separate window. For example, clips for video content items may be provided by the video display window 220, but if a user requests to view an entire content item, that content item can be provided via a full window, enhancing the viewing experience. In addition, the web page 200 can provide an option to download a content item for later viewing.

Figure 3:
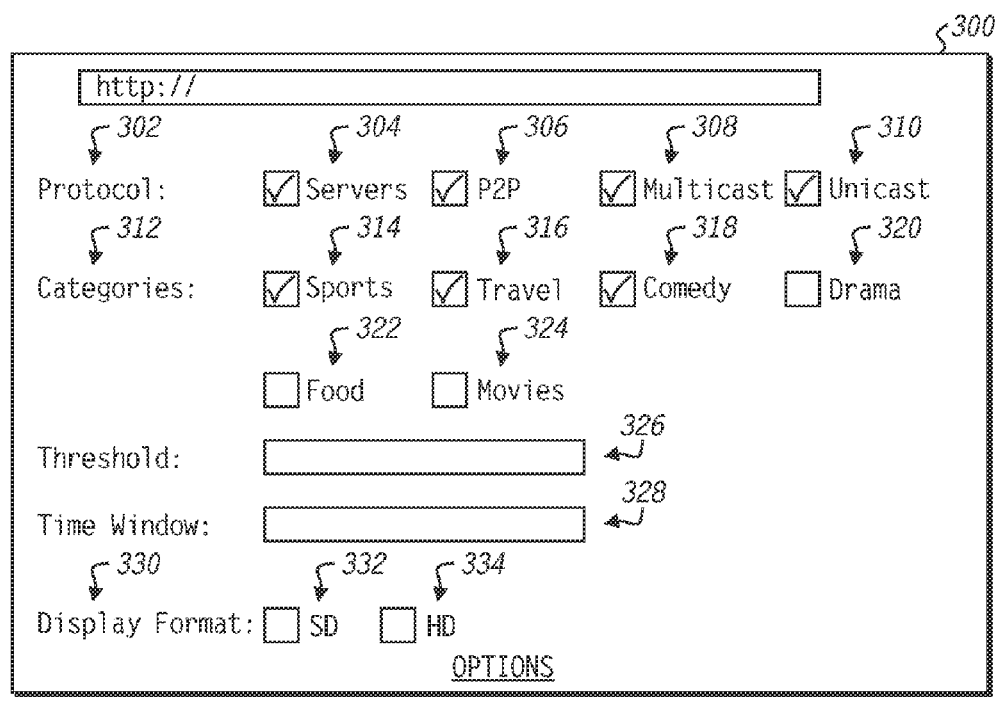
FIG. 3 is a block diagram of a display of video content display options at a client computer of the data network of FIG. 1.

The options button 230 can be used to access viewing options for the web page 200, including options to organize the listing of video display items, the format in which video content items are viewed, and other options. FIG. 3 is a diagram of a particular embodiment of an options page 300 that can be displayed in response to selection of the option button 230.

The options page 300 includes a protocol field 302, a categories field 312, a threshold field 326, a time window field 328, and a display format field 330. The protocol field 302 illustrates a number of network protocol options, including a servers option 304, a peer-to-peer option 306, a multicast option 308, and a unicast option 310. A user can use these options to control the video content items displayed via the web page 200. For example, if a user selects the servers option 304, the web page 200 can display popularity information for video content items requested from servers accessed by the network backbone 110. If the peer-to-peer option 306 is selected, the web page 200 can base the organization and popularity of video content items on peer-to-peer requests for video content items. Similarly, the multicast option 308 and the unicast option 310 provide the user with an option to allow the web page 200 to use requests for multicast video content items and unicast content items to determine the popularity of different content items.

The categories field 312 sets forth a number of category options, including sports option 314, travel option 316, comedy option 318, drama option 320, food option 322, and movies option 324. By selecting particular options in the categories field 312, a user can control which video content items are displayed via the web page 200. For example, if a user selects the sports option 314, video content items associated with sports are displayed via the web page 200. By deselecting the movies option 324, a user indicates that movie content items should not be displayed on the web page 200. Accordingly, the categories field 312 allows a user to target particular topics and genres for display.

The threshold field 326 provides a field for a user to indicate a threshold number of requests for video content items displayed on the web page 200. For example, if a user enters "one million" in the threshold field 326, only video content items that are associated with a number of requests equal to or in excess of one million will be displayed on the web page 200. Thus, the threshold field 326 allows a user to control the number of video content items displayed on the web page 200 based on their popularity.

The time window field 328 provides a field for a user to indicate a time window. In response, the web page 200 will base its display of video content items on requests associated with this time window. For example, a user can select a date range in the time window field 328, such as "last three days." In response, the collected content server 120 will determine the popularity of video content items based on requests received at the traffic monitoring device 130 during the selected date range. Accordingly, the time window field 328 allows a user to select a particular time window upon which the selection of displayed video content items at the web page 200 is based.

The display format field 330 includes options associated with a video format, including a standard definition option 332 and a high definition option 334. A user can control which video content items are displayed via the web page 200 using the standard definition option 332 and the high definition 334. For example, if the standard definition options 332 is unselected and the high definition option 334 is selected, the web page 200 displays only video content items that are available in a high definition format. Accordingly, the display format field 330 allows a user to filter out video items in unwanted formats.

Figure 4:
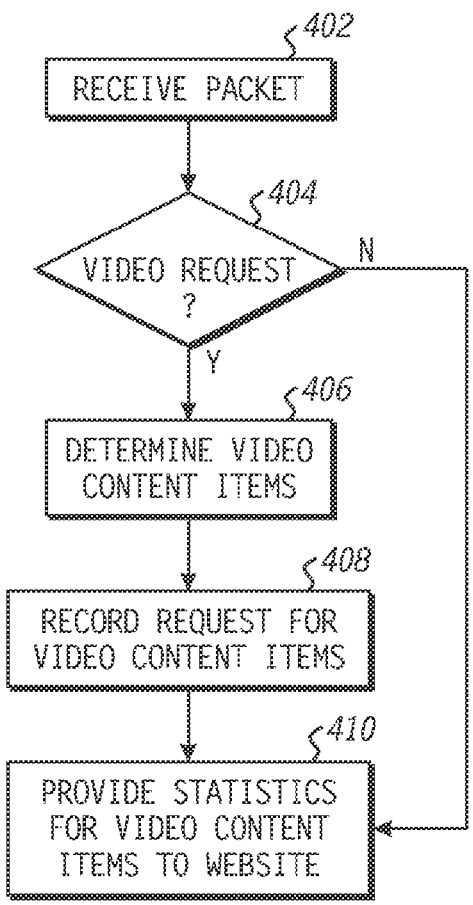
FIG. 4 is a flow diagram of a particular embodiment of a method of monitoring video content.

FIG. 4 shows a flow diagram of a method for monitoring video content is illustrated. At block 402, a packet is received at a traffic monitoring device via a wide area network. At block 404, the traffic monitoring device determines whether the packet represents a request for video content. The traffic monitoring device can make this determination based on a network traffic flow characteristic incorporated in the packet. As used herein, the term network traffic flow characteristic refers to a characteristic indicating how a packet is to be routed through a network. Examples of network traffic flow characteristics include a network address and a transfer protocol.

If the traffic monitoring device determines that the packet represents a request for video content, the method flow moves to block 406 and the traffic monitoring device determines the video content item that has been requested. For example, the traffic monitoring device can compare a network address included in the packet to a database of network addresses and associated video content items to determine the requested item. At block 408, the traffic monitoring device records the request for the video content item. By doing so, the traffic monitoring device keeps track of the number of requests for various content items, thereby recording statistics indicating the popularity of each item.

The method flow proceeds to block 410 and the traffic monitoring device provides statistics for requested video content items to a web site, where the statistics are displayed for a user. A user can access the web site to quickly and easily locate popular video content items.

Figure 5:
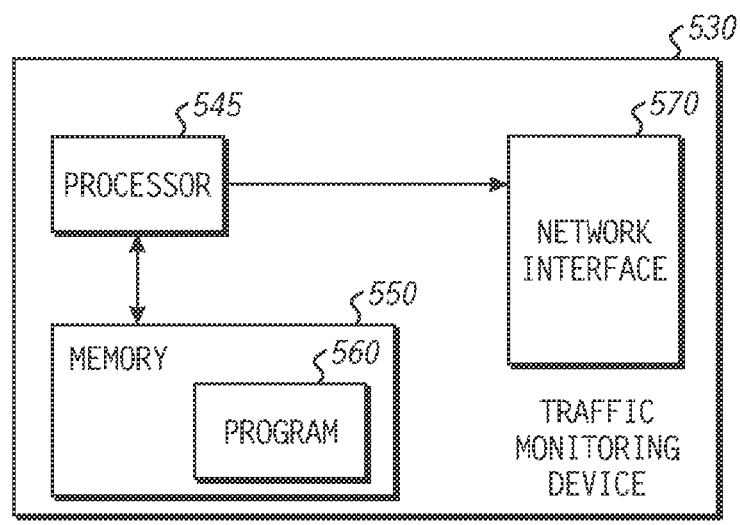
FIG. 5 is a block diagram of a particular embodiment of a traffic monitoring device of FIG. 1.

FIG. 5 shows a block diagram of a particular embodiment of a traffic monitoring device 530, corresponding to the traffic monitoring device 130 of FIG. 1. The traffic monitoring device 530 includes a processor 545, a memory 550, and a network interface 570. The processor 545 is coupled to the network interface 570 and the memory 550.

The memory 550 is a computer readable medium, and can be volatile memory, such as random access memory (RAM), or non-volatile memory, such as flash memory or a hard disk. The memory 550 stores a program 560 that includes instructions to manipulate the processor 545 in order to implement one or more of the methods described herein. For example, the program 560 can include instructions to manipulate the processor 545 to monitor packets received via the network interface 570. Further, the program 560 can include instructions to manipulate the processor 545 to determine whether received packets represent requests for video content items, and to record statistics, such as popularity statistics, for requested video content items. Moreover, the program 560 can include instructions to provide the recorded statistical information to the collected content server 120 for display via a web page.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

What is claimed is:

1. A method, comprising:
receiving, by a system comprising a processor, a plurality of packets indicating transmission of a plurality of video content items;
identifying, by the system, the plurality of video content items and an associated transfer protocol indicator for each video content item from the plurality of packets;
determining, by the system, a popularity level associated with each video content item of the plurality of video content items;
comparing, by the system, for each video content item of the plurality of video content items, the popularity level to a popularity threshold;
selecting, by the system, a first subset of video content items in the plurality of video content items based on the transfer protocol indicator for each video content item; and
presenting, by the system, a first portion of a video content item without presenting a second portion of the video content item, wherein the video content item is in the first subset of video content items, and wherein presenting the first portion of the video content item is responsive to the popularity level exceeding the popularity threshold.

2. The method of claim 1, wherein the presenting the portion of a video content item of the plurality of video content items comprises:
presenting, by the system, an option to view the first portion of the video content item; and
presenting, by the system, a popularity characteristic based on the popularity level associated with the video content item.

3. The method of claim 2, wherein providing the presenting the portion of the video content item of the plurality of video content items further comprises displaying a subject category associated with the video content item.

4. The method of claim 2, wherein the popularity characteristic indicates a number of received requests for the video content item of the plurality of video content items.

5. The method of claim 2, wherein the popularity characteristic indicates a number of received requests for the video content item of the plurality of video content items for a specified period of time.

6. The method of claim 2, wherein the popularity characteristic indicates a user rating for the video content item of the plurality of video content items.

7. The method of claim 1, wherein the presenting the portion of the video content item of the plurality of video content items comprises:
presenting, by the system, an option to download the first portion of the video content item; and
presenting, by the system, a popularity characteristic based on the popularity level associated with the video content item.

8. The method of claim 1, further comprising receiving, by the system, a protocol field indicating one of a multicast protocol, a unicast protocol or a combination thereof.

9. The method of claim 8, wherein the protocol field further comprises one of a server protocol, a peer-to-peer protocol, or a combination thereof.

10. A system, comprising:
a memory to store executable instructions; and
a processor in communication with the memory, wherein the processor, in response to executing the instructions, facilitates performance of operations comprising:
receiving a plurality of packets indicating transmission of a plurality of video content items;
identifying the plurality of video content items and an associated transfer protocol indicator for each video content item from the plurality of packets;
determining a popularity level associated with each video content item of the plurality of video content items;
comparing for each video content item of the plurality of video content items, the popularity level to a popularity threshold;
selecting a first subset of video content items in the plurality of video content items based on the transfer protocol indicator for each video content item; and
presenting a first portion of a video content item without presenting a second portion of the video content item, wherein the video content item is in the first subset of video content items, and wherein presenting the first portion of the video content item is responsive to the popularity level exceeding the popularity threshold.

11. The system of claim 10, wherein the transfer protocol indicator further indicates one of a server protocol, a peer-to-peer protocol, or a combination thereof.

12. The system of claim 10, wherein the operations further comprise:
displaying an option to view the first portion of the video content item without viewing the second portion of the video content item; and
displaying a popularity characteristic based on the popularity level associated with the video content item.

13. The system of claim 12, wherein the popularity characteristic indicates a number of received requests for the video content item of the plurality of video content items.

14. The system of claim 12, wherein the popularity characteristic indicates a number of received requests for the video content item of the plurality of video content items for a specified period of time.

15. A machine-readable storage device comprising executable instructions that, when executed by a processor, facilitate performance of operations, comprising:
receiving a plurality of packets indicating transmission of a plurality of video content items;
identifying the plurality of video content items and an associated transfer protocol indicator for each video content item from the plurality of packets;
determining a popularity level associated with each video content item of the plurality of video content items;
comparing for each video content item of the plurality of video content items, the popularity level to a popularity threshold;
selecting a first subset of video content items in the plurality of video content items based on the transfer protocol indicator for each video content item; and
presenting a first portion of a video content item without presenting a second portion of the video content item, wherein the video content item is in the first subset of video content items, and wherein presenting the first portion of the video content item is responsive to the popularity level exceeding the popularity threshold.

16. The machine-readable storage device of claim 15, wherein the operations further comprise:
    displaying an option to view the first portion of the video content item without viewing the second portion of the video content item.

17. The machine-readable storage device of claim 16, wherein the transfer protocol indicator further indicates one of a multicast protocol, or a unicast protocol; and the operations further comprise presenting a popularity characteristic based on the popularity level associated with the video content.

18. The machine-readable storage device of claim 17, wherein the operations further comprise displaying a subject category associated with the video content.

19. The machine-readable storage device of claim 17, wherein the popularity characteristic indicates a number of received requests for the video content.

* * * * *